Jan. 9, 1940. T. W. GARRISS 2,186,864
ANIMAL TRAP
Filed Feb. 9, 1939

Inventor
Thurman W. Garriss
By
Attorney

Patented Jan. 9, 1940

2,186,864

UNITED STATES PATENT OFFICE 2,186,864

ANIMAL TRAP

Thurman W. Garriss, Watha, N. C.

Application February 9, 1939, Serial No. 255,512

4 Claims. (Cl. 43—85)

This invention relates to animal traps, and more specifically to a trap embodying loop-shaped jaws designed to engage parts of the body of the animal to be trapped and to hold them without injury.

Former traps have been unsatisfactory in that the animal was injured when the jaws of the trap closed upon it, as it was necessary to provide relatively strong springs for the jaws in order to close them upon the animal with sufficient force to prevent escape. Other traps of the so-called sliding loop type were not satisfactory in that the animal had often moved out of reach of the sliding loops before they closed.

An object of this invention is to provide a trap in which the springs actuating the loops are only strong enough to initially trap the animal, the construction of the trap being such that in the animal's struggle to escape, it will close the jaws to tighten them and prevent the escape.

A further object is to provide a trap of a sliding loop type in which the loops will move vertically as well as slide in order to insure better trapping of the animal.

A further object of the invention is to supply loops of a shape so as to be satisfactory for trapping any small sized animal such as a rabbit, raccoon, etc.

Other objects and the nature and advantages of the invention will be apparent from the following description taken in conjunction with the accompanying drawing, wherein.

Figure 1:
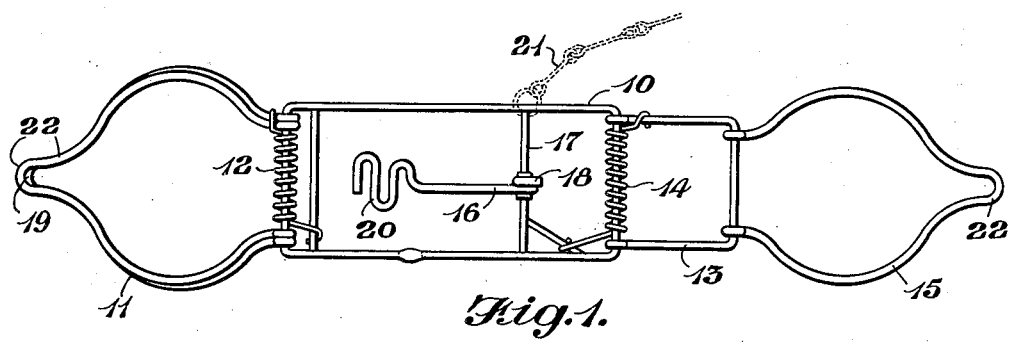
Fig. 1 is a plan view of my trap in fully opened position.
Figure 2:
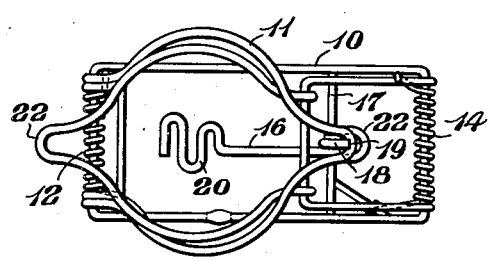
Fig. 2 is a plan view of my trap in set position.
Figure 5:
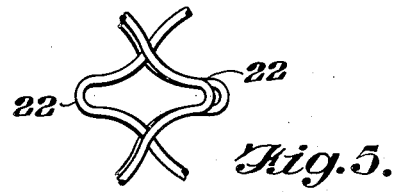
Fig. 5 is a fragmentary detail view of the ends of the jaws.
Figure 3:
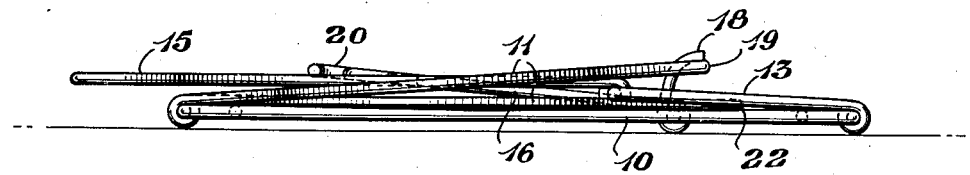
Fig. 3 is an elevation of the trap in set position.
Figure 4:
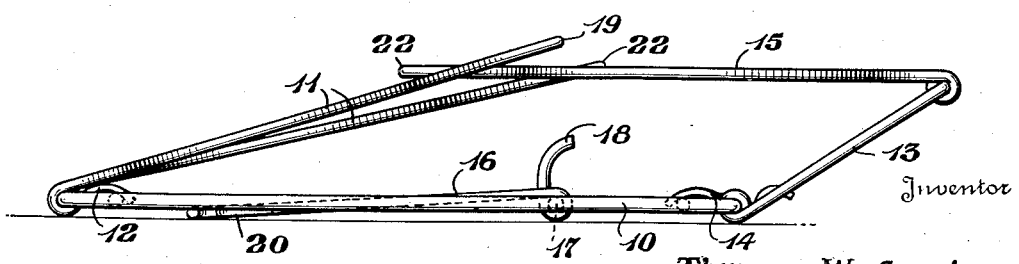
Fig. 4 is an elevation of my trap in sprung position, the jaws being in a position to engage a portion of the animal to be trapped.

The frame 10 of the trap is of rectangular or other suitable shape, preferably made of heavy wire. A double loop jaw 11 is pivoted to a portion of the frame 10 and is provided with a spring 12 in order to hold the jaws in a normally extended position. At the opposite side of the frame 10 is a link member 13 pivoted to the frame and normally held in position by a spring 14 as shown in Fig. 1. To the opposite end of this link member 13 a loop jaw 15 is pivoted. A trigger member 16 is pivoted to a portion 17 of the frame 10 and has a hook member 18 designed to engage and lie over the portion 19 of the loop jaws 11. At the opposite end of the trigger member 16 is a treadle 20 formed on the end of the member. A chain 21 secures the frame 10 to a tree, stake, or other suitable anchoring means. When the trap is set the sliding jaw 15 lies between the jaws 11 so as to coincide with the latter mentioned jaws and form a relatively large substantially circular opening. The treadle 20 is positioned towards the middle of this opening. As the animal approaches the trap and steps within the loops of the jaws 11 and 15 and then actuates the treadle 20 in a downward direction, the link member 13 pivots on the portion 17 of the frame 10 and withdraws the hook member 18 from contact with the jaws 11, releasing jaws 11 and jaw 15. The spring 12 causes jaws 11 to pivot about their axis. At the same time the jaw 15 moves up with jaws 11 due to the fact that it lies between them in the set position. The spring 14 urges the link 13 outwardly which causes the jaw 15 to have a sliding movement relative to the jaws 11 and thus to contract the area within the loops of the jaws. This combined upward and contracting movement, which takes place at the same time, results in a firmer, better, and more sure gripping of the animal in the trap, since the jaws will be caused to grip further up upon a leg or other portion of the body. The portions 22 of the jaws are shaped into a smaller projecting loop as shown in the drawing to insure better gripping of a small portion of the animal's body and render the trap suitable for a wider range of animals. It will be evident that this shape will more securely hold a small animal and yet not decrease the efficiency of the trap in case of a large animal. The springs 12 and 14 which actuate the jaws 11 and 15 are only sufficiently strong to quickly close the jaws about the animal. When the jaws 11 and 15 have closed upon a portion of the animal, they are at rest at an angular position relative to the frame 10 as shown in Fig. 3, so that the struggle of the animal to free itself will only result in the jaws tightening more firmly. Due to this feature, the animal may be trapped without injury.

It will be obvious to those skilled in the art that various changes may be made in this device without departing from the spirit of the invention and therefore the invention is not limited to what is shown in the drawing and described in the specification but only as indicated in the appended claims.

What is claimed is:

1. An animal trap including in combination, a frame member, a pair of loop jaws pivoted to one side of said frame member; a link member pivoted to the opposite side of said frame member, a single loop jaw pivoted to said link member so that said single jaw will lie between said pair of jaws in a set position, resilient means for urging said jaws into an outwardly extended position, and trigger means for holding said jaws in a set position.

2. An animal trap including in combination, a frame member, a pair of loop jaws pivoted to one side of said frame member a link member pivoted to the opposite side of said frame member, a single loop jaw pivoted to said link member so that said single jaw will lie between said pair of jaws in a set position, resilient means for urging said jaws into an outwardly extended position, and trigger means for holding said jaws in a set position, wherein the loop portions of said jaws are substantially superposed.

3. An animal trap including in combination, a frame member, a pair of loop jaws pivoted to one side of said frame member; a link member pivoted to the opposite side of said frame member, a single loop jaw pivoted to said link member so that said single jaw will lie between said pair of jaws in a set position, resilient means for urging said jaws into an outwardly extended position, and trigger means for holding said jaws in a set position, said single jaw being linked to said frame member in a manner to make said jaw capable of arcuate and sliding motion when actuated by said resilient means.

4. An animal trap including in combination, a frame member, a pair of loop jaws pivoted to one side of said frame member; a link member pivoted to the opposite side of said frame member and to a single loop jaw so that said single jaw will be between said pairs of jaws in a set position, resilient means for urging said jaws into an outwardly extended position whereby a common area enclosed by said opposed jaws is contracted and whereby the effort of the animal to escape acts to further contract said area, and trigger means for holding said jaws in a set position.

THURMAN W. GARRISS.